United States Patent Office 3,422,337
Patented Jan. 14, 1969

3,422,337
BATTERY DISCHARGE CONTROL
William N. Carson, Schenectady, N.Y., assignor to General Electric Company, a corporation of New York
Filed May 19, 1966, Ser. No. 551,251
U.S. Cl. 320—14      17 Claims
Int. Cl. H02j 7/00; H02j 7/04; H02j 7/16

ABSTRACT OF THE DISCLOSURE

A sealed secondary battery is protected against cell reversal on discharge by a coulometer cell. The coulometer cell is set to reach a discharged state before any cell of the secondary battery. Upon reaching the discharged state an electrical potential develops across the terminals of the coulometer cell that may be used to sound an alarm or actuate a switch to terminate charge of the secondary battery. The coulometer is constructed of two cadmium electrodes and may incorporate an oxygen storage auxiliary electrode to aid in setting the number of coulombs that may be passed between the electrodes before the discharged state is reached.

---

This invention relates to the art of controlling the discharge of a secondary electric cell. More particularly, it provides a method and apparatus for developing an alarm signal when a multiple cell battery has discharged by a predetermined amount.

When a sealed multiple cell secondary battery undergoes deep discharge, one cell may become fully discharged before the others. During further discharge of the battery, the still-charged cells pass current through the discharged cell in the direction opposite to the charging direction. As a result, water in the discharged cell is electrolyzed, releasing oxygen and hydrogen in the cell. The pressure of these evolved gasses can build up to exceed the strength of the cell case and thereby rupture the cell.

With this problem in mind, it is an object of the present invention to provide improved means for signalling when a secondary electric battery having plural sealed cells has discharged a predetermined amount.

Another object of the invention is to provide improved means for preventing the overdischarge of an electric cell.

A further object of the invention is to provide a signalling device of the above type which can be permanently connected with the storage battery. It is also an object to provide a signalling device that can be left unattended through repeated charge and discharge cycles of the storage battery.

Another object of the invention is to provide means for signalling when a secondary battery has discharged a selected, readily adjusted, amount of current.

It is also an object of the invention to provide an improved method for signalling when a secondary electric battery has discharged a predetermined amount of current.

Other objects of the invention will in part be obvious and will in part appear hereinafater.

The invention accordingly comprises the features of construction, combinations of elements, and arrangements of parts which will be exemplified in the construction hereinafter set forth, and the scope of the invention will be indicated in the claims.

Figure 1:
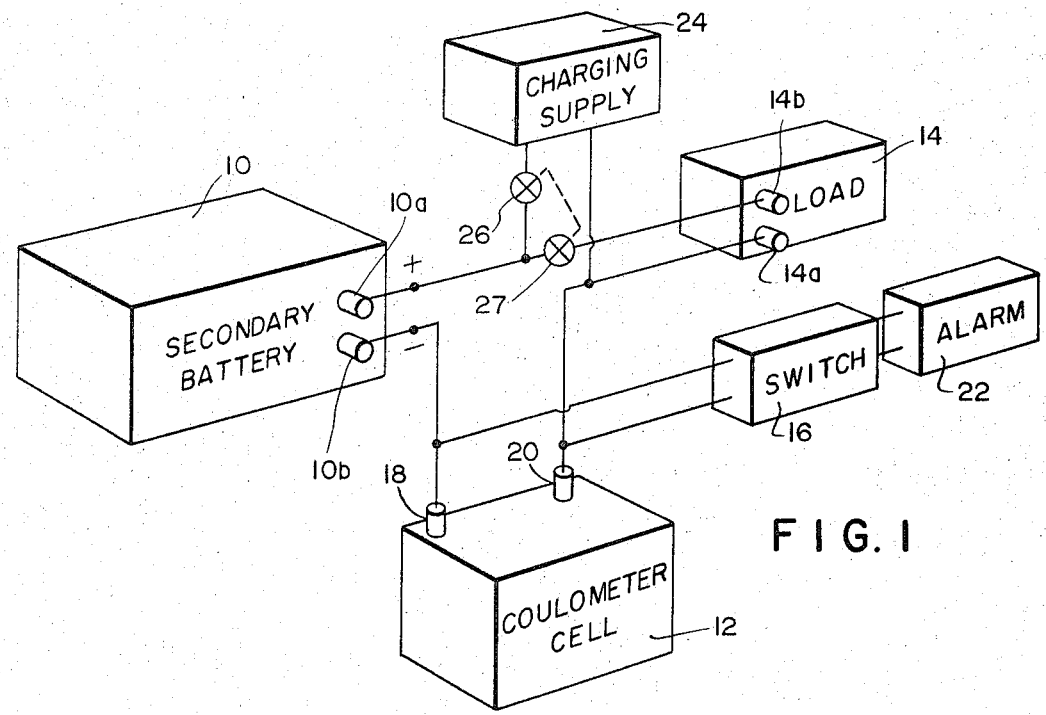
Figure 2:
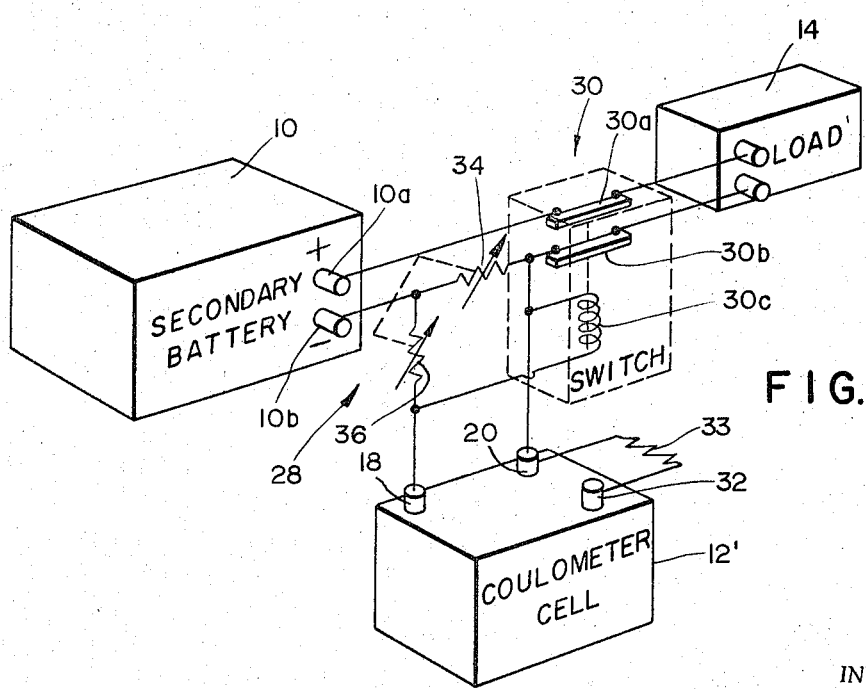

For a fuller understanding of the nature and objects of the invention, reference should be had to the following detailed description taken in connection with the accompanying drawings, in which:

FIGURE 1 shows a battery circuit incorporating a discharge control device embodying the invention; and FIGURE 2 shows the battery circuit with an alternative discharge control arrangement.

In accordance with the invention, an electrochemical coulometer having two electrodes of the same material is connected in the discharge circuit of a secondary electric battery to receive a known portion of the total discharge current from the battery. The coulometer is initially charged according to the maximum charge that is to be drawn from the battery before it is recharged. When the battery has discharged this amount of charge, the voltage across the coulometer rather abruptly changes. The voltage change operates a switch that produces an alarm, or appropriately interrupts the battery discharge circuit.

FIGURE 1 shows a rechargeable battery circuit, such as is used in portable electric equipment, including a secondary battery 10 having a positive electrode 10a and a negative electrode 10b. The battery 10 has a plurality of sealed secondary cells in series between the electrodes 10a and 10b. It is in series with a coulometer cell 12 and a load 14 which has terminals 14a and 14b. A switch 16 is connected across the coulometer electrodes 18 and 20 to operate an alarm device 22 in response to the increased voltage that appears between the coulometer electrodes when the coulometer is discharged beyond its initial charge.

More particularly, the illustrated coulometer cell 12 is approximately constructed in the same manner as a nickel-cadmium battery except that both electrodes 18 and 20 are of cadmium. For example, the electrodes have cadmium hydroxide precipitated on a porous supporting matrix of nickel-coated steel, and are immersed in a liquid electrolyte of potassium hydroxide. The electrode 18 of the coulometer cell is connected to the negative battery terminal 10b and is initially completely discharged, i.e. essentially all its cadmium is in the form of cadmium hydroxide. The coulometer electrode 20 is connected to the load 14 and is initially charged—by converting a portion of the cadmium hydroxide thereof to free cadmium—to the desired capacity to be drawn from the battery before the coulometer develops the "end of discharge" signal.

During discharge of the battery 10 into the load 14, the electrode 18 builds up, by the conversion of cadmium hydroxide to cadmium, in proportion to the number of coulombs drawn from the battery, while the electrode 20 is depleted, by the conversion of cadmium to cadmium hydroxide, by the same amount through conventional electrochemical processes. During this time, i.e. as long as the initially-charged electrode 20 has some free cadmium remaining on it, the voltage between the coulometer electrodes 18 and 20 is relatively low, i.e. below 0.3 volt. This is because the reaction at each electrode is the reverse of the reaction at the other electrode and the resulting equal and opposite potentials cancel out. Thus, essentially the only voltage between the coulometer electrodes 18 and 20 results from the internal resistance of the cell.

However, when the free cadmium at the initially-charged electrode 20 becomes fully depleted, being converted to cadmium hydroxide, the battery discharge current produces a different reaction in the coulometer, i.e. the reaction in the cell changes from the electrolytic consumption of cadmium at the electrode 20 to electrolytic discharge of the hydroxyl ion. This occurs at a considerably higher potential of around 0.8 volt which appears between the electrodes 18 and 20. The switch 16 responds to this rise in voltage and initiates an appropriate alarm, signalling that the battery 10 has discharged to the maximum amount desired.

Discharge of the hydroxyl ion coincides with reduction of cadmium hydroxide on the electrode 18 and oxygen generation at the electrode 20. An equal amount of oxygen is combined with water and cadmium at the electrode 18 to restore the cadmium hydroxide on the electrode. Thus the setting of the coulometer cell is not disturbed by continued discharge.

With further reference to FIGURE 1, a charging supply 24 is connected with a switch 26 in series with both the battery 10 and the coulometer cell 12. A switch 27, operated simultaneously with the switch 26, is arranged to disconnect the load 14 when the switch 26 is closed so that the load 14 does not receive charging current from the supply 24. Thus, when the switch 26 is closed, charging current for the battery 10 also passes through the coulometer cell 12. This charging current converts cadmium to cadmium hydroxide on the electrode 18 and conversely builds up the free cadmium in the electrode 20 to the capacity to which the coulometer cell is set. Once the coulometer cell is thus returned to its initially charged condition, continued passage of charging current through it does not upset the condition of the cell, since the reactions are the same as those following depletion of the electrode 18 during battery discharge (though at the opposite electrodes).

The coulometer cell can be set for a specified charge setting, i.e. the amount of discharge of the battery 10 providing an alarm signal, by the following technique. First, the cell is charged beyond the desired capacity and then sealed temporarily after all the gases are removed. The capacity of the cell is then determined by measuring total charge required to discharge its charged electrode. The excess capacity can be removed by admitting oxygen to the cell. The oxygen combines with electrode cadmium as described above to convert it to cadmium hydroxide. The amount of oxygen required can be calculated according to the following relation:

$$\text{Vol.} = \frac{Q \times G \times P_1 \times T_2}{n \times F \times P_2 \times T_1}$$

where

Vol.=volume of oxygen in cc.
Q=coulombs of excess capacity
G=volume of oxygen per mole at S.T.P. (22,414 cc.)
F=one Faraday=96,500 coulombs/gram equiv.
$n$=Equivalents per mole=4
$P_2$=Pressure of oxygen delivered to cell (mm. Hg)
$P_1$=760 mm.
$T_2$=Absolute temperature of oxygen delivered to cell
$T_1$=273° K.

The amount of oxygen thus determined is introduced into the cell and the cell is then resealed, ready for use.

The capacity of the coulometer 12 is preferably slightly less than the expected capacity of the weakest cell in the battery 10. The coulometer then faithfully produces a signal prior to discharge of the battery 10 beyond the danger point during every charge-discharge cycle of the storage battery.

In FIGURE 2, the storage battery 10 is again connected in series with the electrical load 14. The coulometer cell 12′, however, is connected with the battery discharge circuit through a current divider, indicated generally at 28, so that only a fractional portion of the battery discharge current passes through the coulometer cell. Further, a switch 30 is arranged in series with the load 14 to interrupt the battery discharge circuit when the coulometer cell becomes discharged and the voltage across its electrodes 18 and 20 rises.

The switch 30 has a section 30a in series between the load 14 and the positive battery terminal 10a. A switch section 30b is in series between the load 14 and the current-dividing circuit 28 to interrupt the other leg of the discharge circuit between the battery 10 and the load 14. The switch also has a solenoid 30c connected between the coulometer electrodes 18 and 20 and coupled with the switch sections 30a and 30b. The solenoid opens the switch sections when the voltage developed between the coulometer electrodes increases upon discharge of the battery 10 to the desired level.

The current-dividing circuit 28 comprises a resistor 34 in series between the battery electrode 10b and the switch section 30b and a resistor 36 connected between the battery electrode 10b and the coulometer electrode 18. The resistors 34 and 36 are preferably adjustable, with both resistors being adjusted simultaneously, to change the portion of the battery current that passes through the coulometer cell. In this way, the amount of current discharged from the battery 10 before the coulometer cell becomes fully discharged and opens the switch 30 can be adjusted without having to adjust the capacity of the coulometer cell.

As in FIGURE 1, in the FIGURE 2 arrangement, the charging current for the battery 10 also charges the coulometer cell. Accordingly, the charging supply is connected between the coulometer electrode 20 and the battery electrode 10a so that a fractional portion of the charging current, as determined with the current divider, passes through the coulometer cell.

The coulometer cell 12′ has a somewhat different construction from the coulometer cell 12 of FIGURE 1, although it will be understood that the coulometers are interchangeable in the context of the present invention.

More particularly, the coulometer cell 12′, in addition to having two similar electrodes 18 and 20, both of cadmium, has an auxiliary electrode 32. A small resistor 33, having a suitable resistance, e.g. between 1 and 5 ohms, is connected between the auxiliary electrode and the initially-charged electrode 20. This promotes the recombination of oxygen generated in the coulometer cell on overcharging.

One method for setting the charge capacity of the coulometer 12′ is to place the unsealed cell in an oxygen atmosphere with the auxiliary electrode 32 connected to both cadmium electrodes 18 and 20. This arrangement will completely discharge the cadmium electrodes by conversion to cadmium hydroxide. The cadmium and auxiliary electrodes are then disconnected from each other, the oxygen is pumped off and the cell is filled with hydrogen. The positive terminal of a charging source is then connected to the auxiliary electrode 32 and the cadmium electrode 20 (or 18 as desired) is connected to the negative charging source terminal. A known constant current is drawn from the charging source for a known length of time. This charges the cadmium electrode 20 (or 18) with respect to the auxiliary electrode, and the amount of the charge is determined by the current-time product. The charging supply is disconnected after the desired number of coulombs have been delivered to the cadmium electrode 20 (or 18). The coulometer cell is thus set to that charge and can be sealed after pumping off the excess hydrogen.

Another method of setting the coulometer cell 12′ involves the use of auxiliary electrode 32 that does not self-discharge and that acts as a cathode for the charged cadmium electrode. A mercuric oxide-mercury auxiliary electrode is suitable. The cell is first sealed with the cadmium electrodes fully discharged. The mercury electrode is generally also discharged, i.e. substantially all the mercury thereon is free mercury. The negative terminal of a charge source is connected to the cadmium electrode that is to be charged—for example the electrode 20, and the positive terminal of the charging supply is connected to the mercury electrode 32. With these connections, the charging current converts cadmium hydroxide on the electrode 20 to free cadmium and releases hydroxyl ions into the electrolyte. At the auxiliary electrode, the hydroxyl ions combine with free mercury to produce mercuric oxide and water. After the charge supply is operated to deliver the desired current-time product to the coulometer, the charging operation is complete.

In many instances it may be desirable to use this charging technique to adjust the charge of an initially charged coulometer to a desired final value. For example, when one cadmium electrode is partially charged to a desired value and the auxiliary mercury electrode is partially charged, the charge on the cadmium electrode can be raised to the desired value in the manner set forth immediately above. That is, the external charging supply is connected to remove electrons from the mercury electrode and deliver electrons to the partially-charged cadmium electrode.

Alternatively, when the initial rough setting of the sealed coulometer cell exceeds the desired level, the external charging supply is connected to deliver electrons to the charged cadmium electrode and remove electrons from the mercury electrode. The supply is operated for a time sufficient to discharge the charged cadmium electrode to the desired level.

The auxiliary electrode of mercury thus functions as a "charge reservoir" for both the increase and the decrease of the charge setting of the pair of cadmium electrodes. That is, during charging, the hydroxyl ions released in the conversion of cadmium hydroxide to cadmium form oxygen and water; and the oxygen is stored on the auxiliary electrode in the form of mercuric oxide. During the reverse operation, the auxiliary electrode releases oxygen that together with water forms the hydroxyl ions consumed in the conversion of cadmium to cadmium hydroxide. The mercury auxiliary electrode thus functions as a stable two-way storage system for oxygen.

By way of illustration, the mercury electrode can be fabricated by spreading mercury on a porous metal substrate of manganese oxide or of copper to form an amalgam. Other materials suitable for the auxiliary electrode, i.e. that can perform the oxygen storage function and do not self-discharge, include cupric oxide ($CuO$), silver peroxide ($AgO$) and ferric oxide ($Fe_2O_3$); the copper oxide however is slightly soluble and may give difficulties over long periods of operating time.

A preferred embodiment of the invention has the coulometer cell incorprated within the battery. Thus, a nickel-cadmium battery embodying the invention has a container housing a plurality of series-connected nickel-cadmium cells, as in a conventional nickel-cadmium battery, plus an additional cell having two cadmium electrodes and functioning as the coulometer. The cadmium electrodes of the coulometer are identical with the cadmium electrodes of the nickel-cadmium cells and, of course, are exposed to the same electrolyte as are the nickel and other cadmium electrodes. Where desired, an auxiliary electrode, as discussed above, is arranged in the coulometer cell.

As shown in the drawings, such a discharge-controlling battery preferably has the nickel-cadmium cells successively in series with each other between accessible terminals $10a$ and $10b$ for connection outside the battery container. The coulometer cell terminals, including the terminal for the auxiliary electrode, are also accessible for connection outside the battery housing.

It should be understood that other techniques for setting the capacity of the coulometer can be employed.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described the invention, what is claimed as new and secured by Letters Patent is:

1. An electric circuit comprising in combination
  (A) a secondary battery having a pair of terminals,
  (B) a coulometer cell having first and second electrodes of the same material,
  (C) means connecting said coulometer cell to receive as a discharge current a known function of the discharge current from said battery, and
  (D) voltage responsive output means connected between said coulometer electrodes, said output means producing an output signal in response to the voltage developed between said coulometer electrodes when said battery passes discharge current through said coulometer cell after said coulometer cell is discharged.

2. An electric circuit according to claim 1
  (A) further comprising a pair of terminals for connection to an electrical load, said terminals being connected with said battery to receive said battery discharge current, and
  (B) in which said output means interrupts the circuit between said load terminals and said battery when it produces said output signal.

3. Electrical apparatus according to claim 1
  (A) in which said coulometer cell has an oxygen storage means for use in setting the state of charge of said coulometer electrodes comprised of an auxiliary electrode, and
  (B) further comprising a resistor connected between said auxiliary electrode and one of said coulometer electrodes.

4. Apparatus according to claim 1 in which the maximum charged capacity of said coulometer is proportional to the maximum current to be discharged from said battery, the proportionality between said maximum coulometer capacity and the desired maximum battery capacity being equal to the proportionality of the battery discharge current passed through the coulometer to the total battery discharge current.

5. Electrical apparatus according to claim 1 in which said coulometer cell electrodes are of cadmium hydroxide.

6. Electrical apparatus according to claim 1 further including an oxygen storage means for use in setting the state of charge of said coulometer electrodes comprising an auxiliary electrode in said coulometer cell, said auxiliary electrode being of a material that functions as a stable two-way storage system for oxygen.

7. Electrical supply apparatus comprising in combination
  (A) a multiple cell secondary battery having a positive terminal and a negative terminal,
  (B) a pair of load terminals for connection to an electrical load, said load terminals being in series with said battery terminals,
  (C) a coulometer cell having first and second electrodes of the same material, said coulometer
    (1) having a charged condition wherein said first electrode is charged and said second electrode is discharged, and having a discharged condition wherein said first electrode is discharged,
    (2) developing between said electrodes, when a discharge current is applied between them, a first voltage when in said charged condition and a second voltage when in said discharged condition,
  (D) conductor means
    (1) connecting said second electrode with said battery negative terminal and said first electrode with one of said load terminals, and
    (2) passing through said coulometer a current that is a known linear function of the total discharge current delivered from said battery to said load terminals, and
  (E) output means producing an output signal in response to said second voltage.

8. Apparatus according to claim 7 in which coulometer cell has an oxygen storage means for use in setting the state of charge of said coulometer electrodes comprised of an auxiliary electrode.

9. Apparatus according to claim 8 in which said auxiliary electrode is of a material selected from the group consisting of mercuric oxide, cupric oxide, silver peroxide, and ferric oxide.

10. Apparatus according to claim 7 in which said battery consists of nickel-cadmium cells and in which said coulometer electrodes are of cadmium hydroxide.

11. Apparatus according to claim 7 in which said conductor means includes a current divider passing through said coulometer a known fractional portion of the total discharge current said battery applies to said load terminals.

12. Portable electric equipment comprising in combination
    (A) a multiple cell secondary battery having a positive terminal and a negative terminal,
    (B) an electrical load in series with said battery,
    (C) a coulometer cell having first and second cadmium electrodes, said coulometer being chargeable to a known capacity at which said first electrode is charged and said second electrode is discharged,
    (D) a current divider connected with said battery and said coulometer cell to apply a current that is a known portion of the battery discharge current to said coulometer, with said first electrode being positive with respect to said second electrode, and
    (E) output means
       (1) connected to said coulometer electrodes,
       (2) developing, when battery discharge current is applied to said coulometer, a first output signal when said coulometer is discharged and a second signal when said coulometer is charged.

13. Electrical equipment according to claim 12 in which said output means includes a switch in series between said load and the combination of said battery and current divider, said output means opening said switch when it produces said first output signal.

14. A process for controlling the discharge of a secondary battery, said process comprising the steps of
    (A) discharging an electrochemical coulometer cell by passing a known proportion of the discharge current from the secondary battery therethrough, and
    (B) producing a control signal in response to the voltage developed between the coulometer electrodes when the coulometer receives battery discharge current after the coulometer cell has become discharged.

15. A process according to claim 14 wherein setting said coulometer cell to said initial charge comprises the further step of applying charging current to one electrode of the coulometer cell and to a further auxiliary electrode of the coulometer cell.

16. A process according to claim 14 wherein said coulometer cell has two cadmium electrodes and an auxiliary electrode, and wherein setting said coulometer cell to said initial charge comprises the further steps of
    (A) discharging the coulometer electrodes,
    (B) sealing the coulometer cell with a substantially hydrogen atmosphere therein, and
    (C) applying charging current to deliver electrons to the cadmium electrode to be charged and to remove electrons from the auxiliary electrode.

17. A process according to claim 14 wherein said coulometer cell has two cadmium electrodes and an auxiliary electrode that acts as a cathode with the cadmium electrodes and is arranged to function as a stable two-way storage system for oxygen, and wherein setting said coulometer cell to said initial charge comprises the further step of applying charging current to one cadmium electrode and to the auxiliary electrode with the coulometer cell sealed.

References Cited
UNITED STATES PATENTS

| | | | |
|---|---|---|---|
| 3,302,091 | 1/1967 | Henderson | 320—48 |
| 3,321,690 | 5/1967 | McCarthy et al. | 320—40 X |
| 3,329,882 | 7/1967 | Sobel | 320—39 |
| 3,356,922 | 12/1967 | Johnston | 320—40 X |

JOHN F. COUCH, *Primary Examiner.*

STANLEY WEINBERG, *Assistant Examiner.*

U.S. Cl. X.R.

320—40, 48; 324—29.5, 94